(12) United States Patent
Corne et al.

(10) Patent No.: US 10,184,600 B2
(45) Date of Patent: Jan. 22, 2019

(54) COUPLING FOR CONNECTING PIPE ENDS AND BRIDGING FOR USE IN A COUPLING

(71) Applicant: ATLAS COPCO AIRPOWER, naamloze vennootschap, Wilrijk (BE)

(72) Inventors: Jan Pieter Robert Corne, Wilrijk (BE); Bert Hendrik Hilda Meul, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 187 days.

(21) Appl. No.: 15/104,455

(22) PCT Filed: Dec. 12, 2014

(86) PCT No.: PCT/BE2014/000069
§ 371 (c)(1),
(2) Date: Jun. 14, 2016

(87) PCT Pub. No.: WO2015/089592
PCT Pub. Date: Jun. 25, 2015

(65) Prior Publication Data
US 2017/0002962 A1    Jan. 5, 2017

(30) Foreign Application Priority Data
Dec. 17, 2013  (BE) .................... 2013/0845

(51) Int. Cl.
*F16L 25/01*    (2006.01)
*F16L 19/075*   (2006.01)
(Continued)

(52) U.S. Cl.
CPC ............. *F16L 25/01* (2013.01); *F16L 19/075* (2013.01); *F16L 19/086* (2013.01);
(Continued)

(58) Field of Classification Search
CPC .................................. F16L 25/01; H01R 4/60
(Continued)

(56) References Cited

U.S. PATENT DOCUMENTS 3,739,460 A * 6/1973 Addis ....................... H01R 4/10
                                                         29/516
4,107,452 A * 8/1978 Razvi ....................... F16L 25/01
                                                        174/84 S
(Continued)

FOREIGN PATENT DOCUMENTS

DE   102011121088 A1   6/2013
EP      0064315 A2    11/1982
(Continued)

OTHER PUBLICATIONS

International Search Report (ISR) dated May 18, 2015, for PCT/BE2014/000069.
(Continued)

*Primary Examiner* — Aaron M Dunwoody
(74) *Attorney, Agent, or Firm* — Bacon & Thomas, PLLC

(57) ABSTRACT

A coupling for connecting pipe ends, comprising a hollow body with an entrance for each pipe end provided with a radial seat for a pipe end and a coupling nut for clamping the pipe end, whereby an electrically conductive bridge is provided, which at the location of the seats is provided with a clamping element that is elastically deformable in the radial direction with respect to the respective seat, and is provided with a contact section, which in a rest situation is at a distance from the axis of the seat that is smaller than an outside radius of the pipe end for which the seat concerned is intended.

16 Claims, 5 Drawing Sheets

(51) Int. Cl.
*F16L 19/08* (2006.01)
*F16L 37/091* (2006.01)
*H01R 4/64* (2006.01)
*H01R 13/00* (2006.01)

(52) U.S. Cl.
CPC ............ *F16L 37/091* (2013.01); *H01R 4/643* (2013.01); *H01R 4/646* (2013.01); *H01R 13/005* (2013.01)

(58) Field of Classification Search
USPC ........................................ 285/383; 174/84 S
See application file for complete search history.

(56) References Cited

U.S. PATENT DOCUMENTS

| | | | | |
|---|---|---|---|---|
| 4,215,384 A | * | 7/1980 | Elson | F16L 11/127 138/103 |
| 4,312,551 A | | 1/1982 | Mascolo | |
| 4,487,462 A | * | 12/1984 | Gale | F16L 25/01 361/215 |
| 4,659,870 A | * | 4/1987 | Jones | F16L 21/005 174/84 S |
| 5,799,984 A | * | 9/1998 | Reynolds, Jr. | F16L 25/01 285/317 |
| 6,664,473 B2 | * | 12/2003 | Christman | H01R 13/5845 174/74 R |
| 8,419,071 B2 | * | 4/2013 | Gentille | F16L 33/01 285/222.1 |
| 2002/0106923 A1 | * | 8/2002 | Copeland | H01R 4/60 439/192 |
| 2004/0025682 A1 | * | 2/2004 | Frisch | F15B 15/202 92/5 R |
| 2004/0036290 A1 | * | 2/2004 | Bock | F16L 11/127 285/343 |
| 2004/0109961 A1 | * | 6/2004 | Winter | C03C 17/005 428/34.4 |
| 2013/0048128 A1 | * | 2/2013 | Roederer | B64D 11/02 138/33 |
| 2017/0040717 A1 | * | 2/2017 | Le Quere | F16L 25/01 |

FOREIGN PATENT DOCUMENTS

| | | |
|---|---|---|
| FR | 1166054 A | 11/1958 |
| GB | 2204189 A | 11/1988 |

OTHER PUBLICATIONS

International Preliminary Report on Patentability (IPRP) dated Feb. 29, 2016, for PCT/BE2014/000069.

* cited by examiner

COUPLING FOR CONNECTING PIPE ENDS AND BRIDGING FOR USE IN A COUPLING

BACKGROUND OF THE INVENTION

The present invention relates to a coupling for the leak-free connection of pipe ends of pipes that are intended for transporting liquid and/or gaseous media, more specifically for the transport of a gas such as nitrogen or compressed air or for conveying a vacuum.

Such couplings are already known in the form of a sleeve-shaped hollow body with entrances for the pipes to be connected, whereby the entrances are provided with a radial seat with an end stop in which an aforementioned pipe end can be held, and whereby each entrance is provided with a coupling nut that fits around the pipe end to be connected and which can be tightened on the body in order to clamp a pipe end concerned in the coupling, whereby at least one gasket is provided between the coupling nut and the body, which is tensioned when the coupling nut is tightened in order to obtain a leak-free seal.

The pipes and couplings can be can made of metal, for example aluminium, provided with a protective coating or paint or otherwise, in which case the pipe system of the pipes coupled together sometimes have to be connected to an electrical earth.

When such pipes and couplings are used in an explosion-sensitive environment, for example when trading or transporting powdered bulk products, the pipe system of connected pipes and couplings must be earthed.

Indeed, when transporting liquids or gases through the pipes static electricity can be generated due to the friction between the gas or the liquid on the one hand, and the pipe system on the other, which can lead to the occurrence of sparks if the pipe system is not earthed.

However, the present couplings of the aforementioned type are generally made of a hard plastic, as such couplings can be produced more cheaply by injection moulding or similar, and such couplings are also insensitive to corrosion.

A problem that occurs here is that each plastic coupling forms an electrical break between two metal pipes coupled together.

This means that such a pipe system with plastic couplings cannot be used as an earth conductor and consequently a separate earth conductor has to be provided for the earthing.

The electrical break at the location of each plastic coupling also means that, in the event of explosion-sensitive conditions, each metal pipe has to be earthed separately to be able to conduct the generated static electricity away.

This means a substantial price increase as such earthing must be implemented with the necessary care in order to guarantee a sufficiently low electrical resistance of the earthing, which is required for good earthing.

A known but little applied solution is to connect the metal pipes together using an external electrical conductor to bridge the electrical break at the location of the couplings between the pipes.

However, this solution has the disadvantage that it requires further work after connecting two pipes together with a plastic coupling, i.e. an extra bridge has to be affixed across the coupling.

An additional disadvantage is that there must be facilities to be able to construct the bridge with the required low resistance. For example, the pipe surface must be prepared to be able to make a good electrical connection, for example by suitable cleaning for a bare metal pipe, and for a coated metal pipe by scraping or rubbing off the coating. Then the bridge must be affixed there by means of soldering, brazing, clamping or similar.

All this means extra costs in materials and working hours.

Another disadvantage of an external bridge is that it is exposed to the risk of accidental damage or sabotage, in which case an explosion hazard arises on account of inadequate earthing without it being discovered in time.

SUMMARY OF THE INVENTION

The purpose of the present invention is to provide a solution to one or more of the aforementioned and/or other disadvantages.

To this end the invention concerns a coupling for connecting pipe ends, whereby this coupling comprises a hollow body with an entrance for each respective pipe end to be connected, whereby each aforementioned entrance is provided with a radial seat for an aforementioned pipe end with radius R, whereby a coupling nut is provided at each end of the body for clamping a pipe end concerned in the coupling, whereby the body is provided on the inside with a bridge, at least partially of electrically conductive material, with at least two ends that are provided with a clamping element at the location of a seat, which is elastically deformable in the radial direction with respect to the seat, and is provided with a contact section, which in a rest situation, i.e. in the absence of a pipe end, is at a distance from the axis of the seat that is smaller than the aforementioned radius R of the pipe for which the seat concerned is intended.

In order to connect pipes together, a pipe end of each pipe is pushed in the axial direction in a seat of one of the entrances of the coupling until a resistance is felt upon contact with a clamping element of the bridge, after which the pipe is pushed somewhat deeper into the coupling to push the contact section of the clamping element outwards in the radial direction, such that due to the elasticity of the clamping section the pipe end is clamped in the seat as it were. This has the additional advantage that the pipe ends do not simply slide out of the coupling before the coupling nuts are tightened, which facilitates assembly.

Due to the clamping force of the clamping element an adequate electrical contact is made between the contact section of the clamping element of the bridge and the outside periphery of the metal pipe end.

When two or more pipes are connected together in such a way, the aforementioned contact between the pipe and the bridge ensures an electrical connection between coupled pipes, which means that if earthing is required, not all pipes have to be earthed separately.

When a pipe to be coupled is pushed in the coupling, the contact section slides over the pipe end concerned with a radial tension, such that when making the coupling this contact section exerts a scraping or cutting effect on the periphery of the pipe, such that any corrosion or any protective layer there is breached or removed locally and a better electrical contact is thus brought about.

This effect can be further improved by providing the contact section with one or more teeth oriented inwards.

Another advantage of a coupling according to the invention is that the bridge is fitted internally such that it is protected against accidental or intentional damage.

Another advantage is that when the coupling is used the clamping elements are always compressed in the same fixed way when fitting a pipe resulting in a known clamping force, and that these clamping elements consequently cannot be overloaded and thus cannot be damaged due to overload.

Another advantage is that pipes with such a coupling are easy to connect without special tools being required.

Preferably at least one entrance of the body of the coupling is provided with an axial end stop for the axial insertion of a pipe end.

Such an axial end stop, together with the radial seat, ensures that the pipe ends are always fitted in the most suitable position when the pipe is pushed against the end stop in the coupling. This prevents incorrect assembly whereby for example the pipe is not pushed deep enough into the coupling and thereby could make a poor electrical contact with the bridge.

This end stop can be formed by a shoulder, for example, that is formed by a stepped narrowing of a wide section of the entrance with a radius that is greater than the outside radius R of the pipe for which the seat of the entrance concerned is intended, and a narrow section with a radius that is smaller than the outside radius R of the pipe.

The wide section of the entrance thereby forms space for the clamping elements and for radial ribs oriented inwards to form the aforementioned seat.

According to a practical embodiment the bridge is formed by a clamping bracket with a clamping section at the ends, whereby this these clamping sections are intended to clamp the bridge in the body, for example by snapping these clamping sections in place behind an aforementioned end stop of an entrance.

This embodiment provides the advantage that the bridge can be easily affixed or removed depending on whether the coupling has to be used for an application with or without an electrical continuity connection between the coupled pipes.

In this way only one type of coupling is needed for both applications, whereby the couplings are or are not supplemented by one or more bridges according to need.

According to a preferred characteristic, in the assembled situation of the bridge the clamping element rests on the inside wall of the wide section of an entrance, which ensures constant support for the elastic clamping element in the compressed state in the case of a fitted pipe and thus a constant clamping force of the contact section.

The invention also relates to a bridge for use in a coupling for connecting pipe ends, whereby this bridge is at least partially made of electrically conductive material for an electrical connection between the pipe ends, whereby the bridge is provided with one or more clamping elements that are connected together by means of a connecting part, whereby each clamping element is elastically compressible and is provided with a contact section that is intended to make contact with this pipe end due to the compression of this clamping element concerned upon assembly of a pipe end in an aforementioned coupling.

Such a bridge has the advantage that it can be realised and used in a simple way as the electrical contact with a pipe end is automatically made when a pipe end concerned is fitted in the coupling.

BRIEF DESCRIPTION OF THE DRAWINGS

With the intention of better showing the characteristics of the invention, a preferred embodiment of a coupling according to the invention and a bridge hereby applied is described hereinafter by way of an example, without any limiting nature, with reference to the accompanying drawings, wherein.

DETAILED DESCRIPTION OF THE INVENTION

Figure 1:
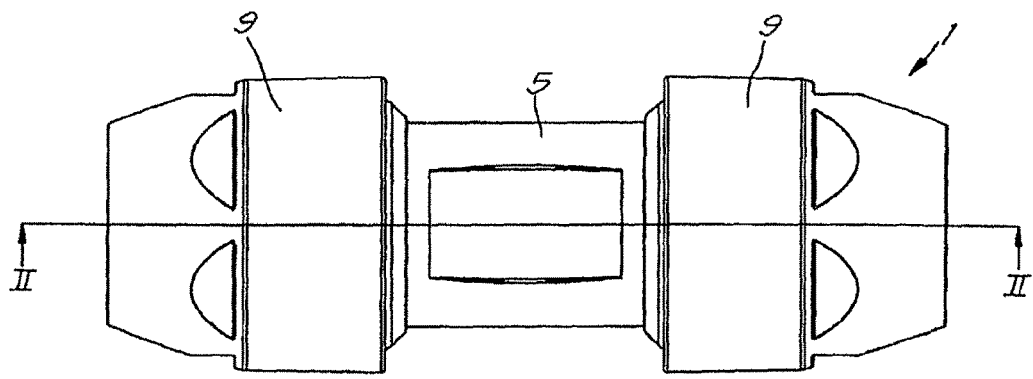
FIG. 1 shows a side view of a straight coupling according to the invention.
Figure 2:
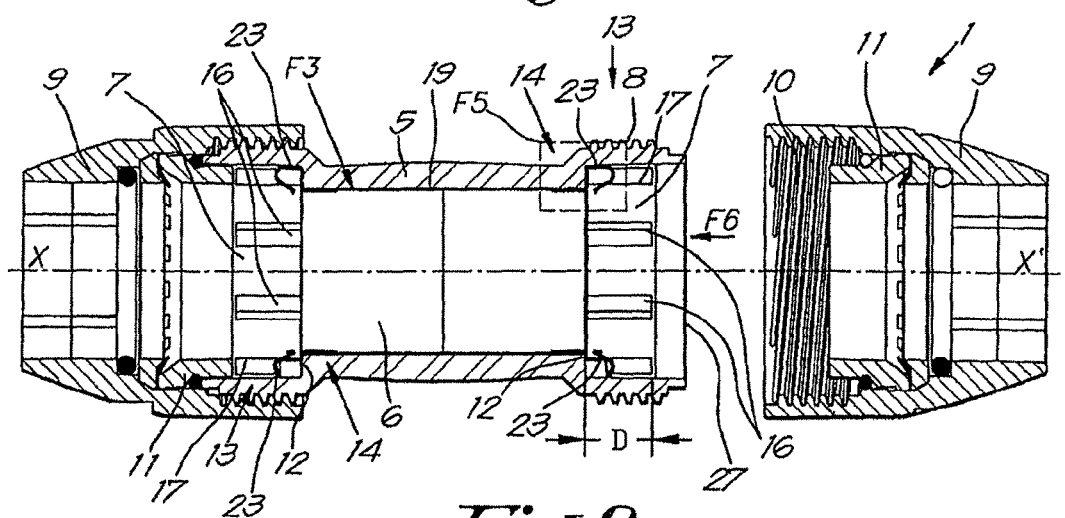
FIG. 2 shows a cross-section according to line II-II of FIG. 1, but for a coupling that is partly dismantled.
Figure 7:
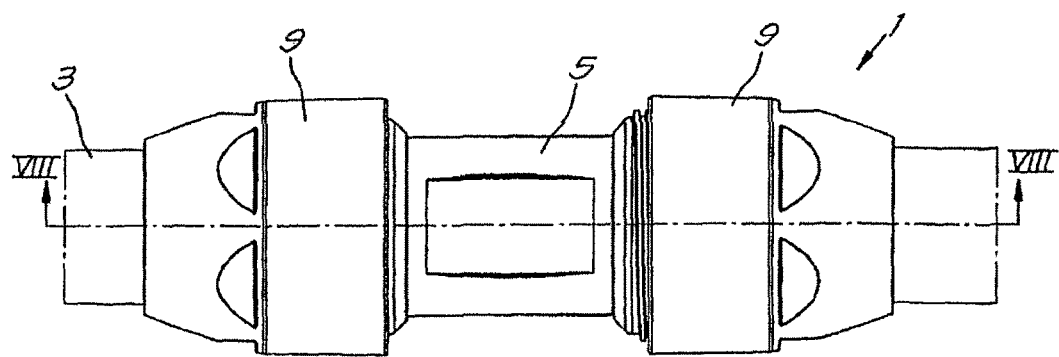
FIG. 7 shows the coupling of FIG. 1 in the used situation for coupling two pipes together, whereby the right-hand coupling nut has not yet been tightened.

The coupling shown in FIGS. 1 and 2 is a coupling that is intended to connect two pipe ends 2 of pipes 3 together, as shown in FIG. 7.

In this case the coupling 1 is a straight coupling to assemble two pipes 3 in line with one another.

In the example shown the coupling 1 is intended to connect two cylindrical pipes 3 with the same outside radius R together, although it is not excluded to provide couplings 1 according to the invention for coupling pipes with different dimensions of the outside radius.

The pipes 3 are intended, for example, for transporting gases or liquids, pressurised or otherwise, or for conveying a vacuum and are generally made of an electrically conductive material, such as aluminium, that is often provided with a protective layer 4 on the outside in the form of a coating, coat of paint or similar.

However, the invention can also be used for metal pipes without a protective layer, or even for pipes that are not completely metalic.

As can be seen in the cross-section of the coupling 1 in FIG. 2, the coupling 1 comprises a hollow body 5 of plastic with an internal passage 6 for liquids or gases that extends around an average central geometric axis X-X' of the coupling 1.

This body 5 is provided with an entrance 7 at both ends for an aforementioned pipe end 2, whereby this entrance 7 is coaxial with respect to the aforementioned axis X-X', and whereby this entrance 7 is provided with an external screw thread 8 on which a coupling nut 9 of plastic or similar with an internal screw thread 10 can be tightened in order to clamp a pipe end 2 concerned in the coupling 1 in a known way.

Each coupling nut 9 comprises a gasket 11, which together with the coupling nut is affixed around a pipe end 2 concerned, and which is tensioned when the coupling nut 9 is tightened around the pipe end 2 in a known way in order to obtain a safe connection of the pipe end 2 in the coupling 1.

Figure 5:
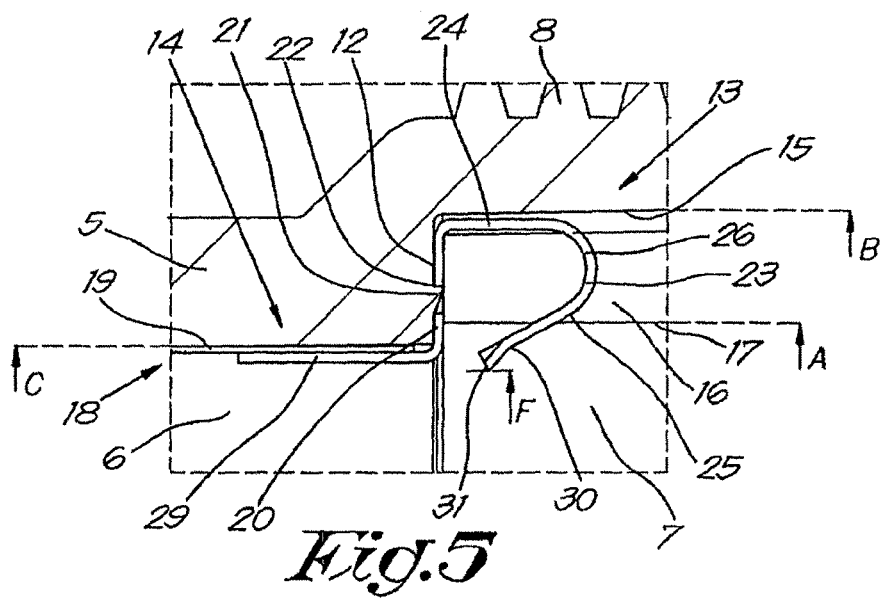
FIG. 5 shows the section indicated by the box F5 in the cross-section of FIG. 2 on a larger scale.
Figure 6:
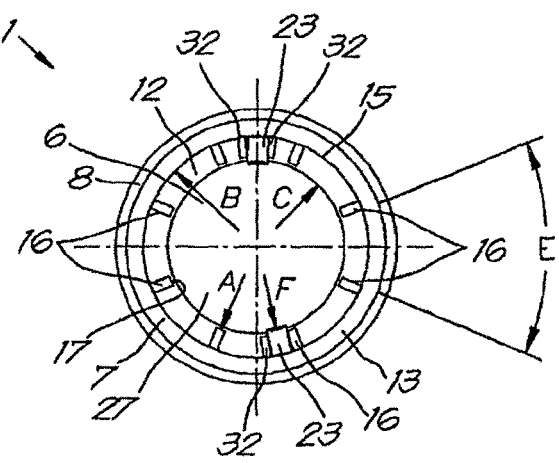
FIG. 6 shows an end view according to arrow F6 in FIG. 2, however with the omission of the dismantled section of FIG. 2.

As can be seen in detail in FIG. 5, each entrance 7 for a pipe end 2 comprises an axial end stop 12 that is formed by a shoulder that is formed by a stepped narrowing of the entrance 7 of a wide internal section 13 with a radius B that is greater than the outside radius R of a pipe end 2 for which the entrance 7 concerned is intended, and a narrow internal section 14 coaxial therewith with a radius C that is smaller than this outside radius R.

On the inside wall 15 of the wide section 13 of the entrance 7 is a series of radial ribs 16 oriented inwards that extend over a certain length D in an axial direction up to against the end stop 12, and which are distributed evenly with a certain mutual angular displacement E over the inside wall 15.

These ribs 16 together define a radial seat 17 with radius A corresponding to the outside radius R of a pipe end 2, save for a clearance.

According to the invention the body 5 is provided on the inside with a bridge 18 of electrically conductive material, preferably spring steel or stainless steel, whereby this bridge 18 is intended to bring about an electrical connection with the lowest possible resistance of 0.1 to 0.2 ohms, for example, between two pipes 3 mounted in the coupling 1.

In the embodiment of FIGS. 1 and 2 there are two bridges 18, i.e. one top one and one bottom one, although a single bridge 18 could suffice or more than two bridges could also be affixed, depending on the electrical resistance that is to be obtained with the bridges.

Figure 3:
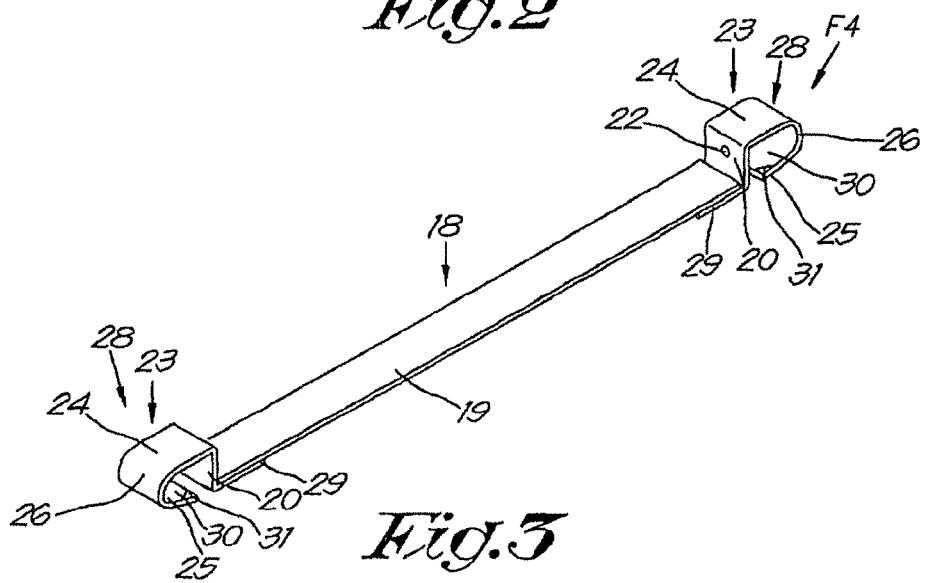
FIG. 3 shows a perspective view of a bridge that is indicated by F3 in FIG. 2.
Figure 4:
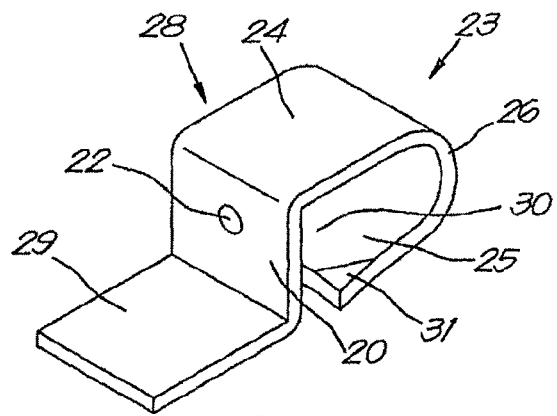
FIG. 4 shows the section indicated by F4 in FIG. 3 on a larger scale.

In the example shown the bridge 18 is constructed in the form of a clamping bracket as shown in perspective in FIG. 3 that can be clamped to or snapped in the body 5 of the coupling 1 in order to make contact with each of the aforementioned pipes 3.

To this end the bridge 18 is provided with a slat-shaped connecting part 19 that essentially follows the form of the inside wall of the body 5 between two end stops 12 in the axial direction, and which is provided at both ends with a perpendicular folded clamping section 20 with which the bridge 18 can be hitched behind an aforementioned axial end stop 12.

To this end each end stop 12 is provided with a protrusion 21 extending in the axial direction that can engage with a corresponding notch in the clamping section 20 in order to be able to snap the bridge 18 in place.

Alternatively the protrusion 21 can of course also be provided on the clamping section 20 to be able to engage with a notch 22 in the axial end stop 12.

The bridge 18 of FIG. 3 is provided with a clamping element 23 at each end, which in the mounted situation is at the location of a seat 17 of an entrance 7, and which is elastically deformable in the radial direction.

Each clamping element 23 is formed by a U-shaped or V-shaped folded element whose arms 24 and 25 are elastically compressible towards one another and which extend in the axial direction in line with the connecting part 19 with the back 26 oriented towards the opening 27 of the entrance 7 concerned, and with the opening between the arms 24 and 25 oriented towards a clamping section 20 concerned, to which one arm 24 is connected due to the clamping section 20 and the clamping element 23 being folded from one piece of metal.

In the example of FIG. 3 the bridge 18 is composed of three parts, i.e. the connecting part 19 that is formed by a slat and two separate heads 28 that are each folded from one metal slat to form a clamping element 23 and a clamping section 20 connected thereto that is folded perpendicularly to form a lip 29 to which such a head 28 is fastened at the end of the connecting part 19 by spot welding or similar.

The bridge 18 is preferably dimensioned such that, in the mounted rest situation of the bridge 18, i.e. in the absence of pipe ends 2 as in the case of FIGS. 2 and 5, the clamping elements 23 rest with one arm 24 on the inside wall 15 of the wide section 13 of an entrance 7, while the other arm 25 comprises or forms a contact section 30 that is at a distance F from the axis X-X' that is smaller than the aforementioned radius R of a pipe 3 for which the entrance 7 concerned is intended.

The contact section 30 is preferably, but not necessarily, provided with one or more teeth 31 oriented inwards, for example formed by the folded corners of the arm 25 or by one or more V-shaped or U-shaped sections of the contact section 30 that are partly pushed inwards.

Furthermore, the coupling 1 can be provided with locking means 32 to prevent the turning of the clamping elements 23 around the axis X-X' of the respective entrances 7 of the coupling 1, whereby in this case these locking means are formed by ribs 32 in the wide section 13 of the entrance 7 between which the clamping elements can be held with a close fit.

The use of a coupling 1 according to the invention is very simple and as follows.

Figure 8:
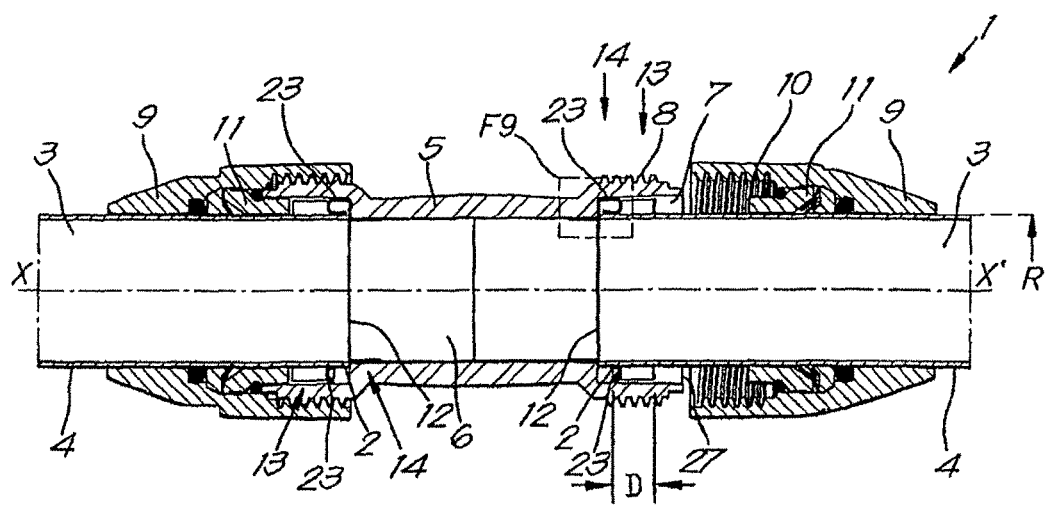
FIG. 8 shows a cross-section according to line VIII-VIII of FIG. 7, but for a semi-fitted coupling.
Figure 9:
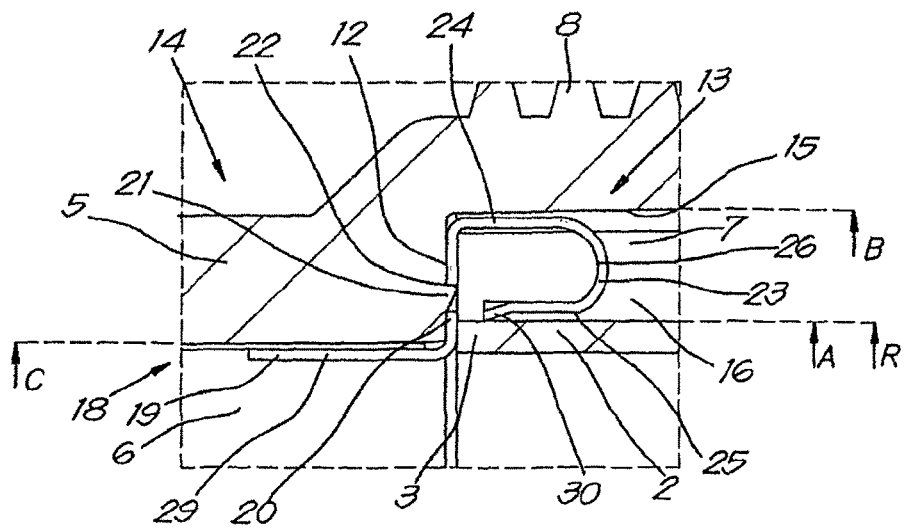
FIG. 9 shows the section indicated by the box F9 in the cross-section of FIG. 7 on a larger scale.

Starting from the situation of FIG. 1 the coupling nuts 9 are first loosened and are slid over the pipe ends 2 to be connected together with their gaskets 11, after which the pipe ends 2 are pushed in the axial direction into the entrances 7 of the coupling 1 up to against an end stop 12, as shown in the right-hand part of FIG. 8 and in the detail drawing of FIG. 9.

Alternatively couplings 1 can be used whose coupling nuts 9 are premounted with a certain torque, whereby this torque is such that the pipe ends 2 can be pushed in the entrances 7 up to against the end stop 12, and are thereby adequately secured in a leak-free way without the coupling nuts 9 having to be further tightened.

Hereby the contact section 30 with the teeth 31 is pushed outwards as shown in detail in FIG. 9.

As a result of the arms 24 and 25 are compressed in the radial direction and an elastic reaction force is exerted in the radial direction on the outer periphery of the pipe 3 by the contact section 30 with the teeth 31.

As a result of this force, during the last part of the pushing movement of a pipe 3, any protective layer 4 present is breached or scraped off by the teeth up to the bare metal, such that a good electrical contact is guaranteed.

For a pipe end 2 with an outside diameter of 50 mm for example, to obtain sufficient tension, a U-shaped clamping element 23 can be used with an opening of the arms of approximately 7 mm, which is compressed by a distance of 2 mm for example when pushing in a pipe end 2.

A coating can be applied on the teeth 31 and/or other parts of the contact section 30, for example a coating of silver, gold, nickel or similar, for example for better contact conduction and/or for protection against corrosion.

It is clear that a bridge 18 can also be fastened in the body 5 of the coupling 1 in other ways, for example by pushing or sticking with double-sided adhesive tape or by means of other fastening means, or can be cast into the plastic of the body 5 of the coupling 1.

It is also clear that in this case clamping sections 20 are not necessarily required.

An end stop 12 does not necessarily have to be formed by a shoulder that is formed by a narrowing of the diameter of the entrance 7. In the absence of such a shoulder the clamping elements 23 can also be partly sunk in a radial hollowing of the inside wall of the entrance 7 for example, whereby this inside wall is preferably made cylindrical for example to form a seat 17 for the pipe end 2, in which case there are no ribs 32 to form such a radial seat 17.

It is clear that a coupling 1 can also be used on metal pipes 3 without a protective layer or on plastic pipes 3, whereby in this last case the bridges 18 can be removed.

Figure 10:
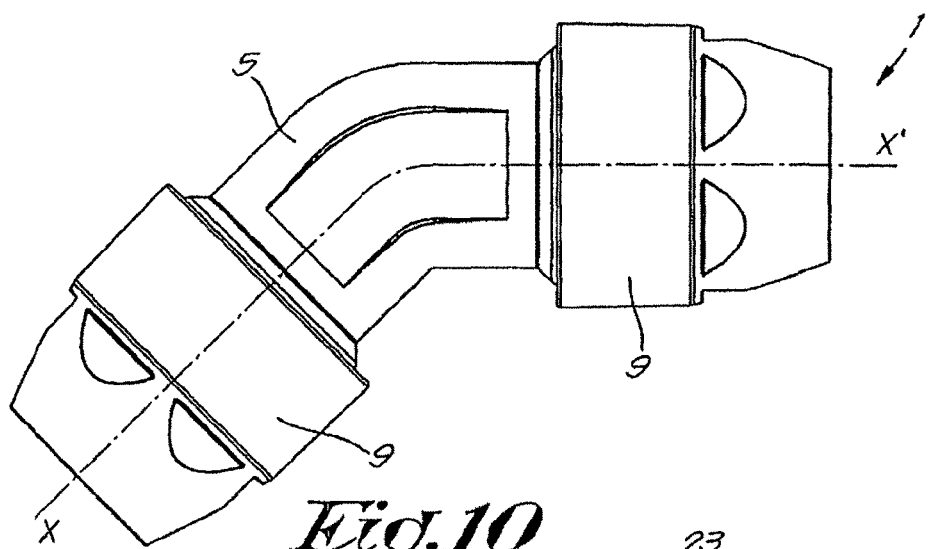
FIGS. 10 and 12 each show a side view of an embodiment of an elbow coupling according to the invention for connecting two pipes at an angle of 45° and 90° respectively.
Figure 12:
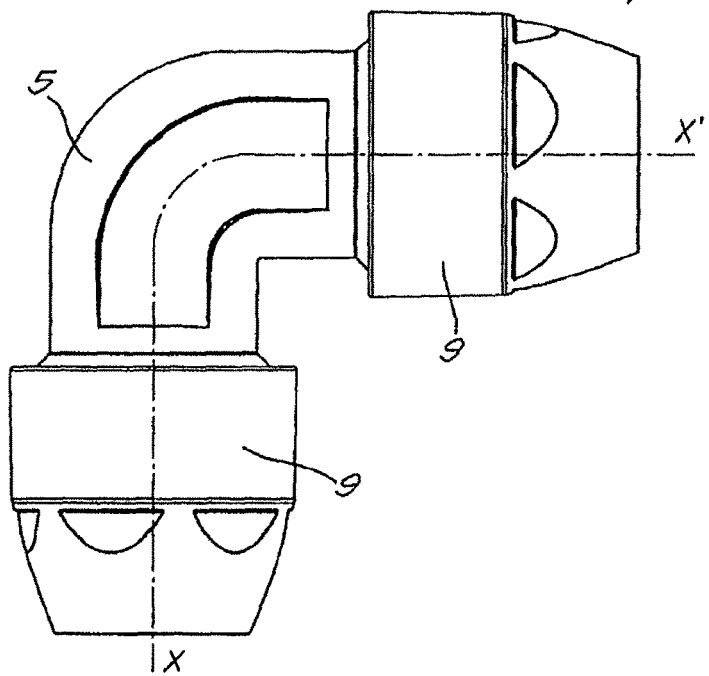

The invention can also be applied in non-straight couplings 1, as shown in FIGS. 10 and 12, in which elbow couplings 1 are shown that are provided for connecting two pipes 3 at an obtuse angle or at a right angle respectively.

Figure 11:
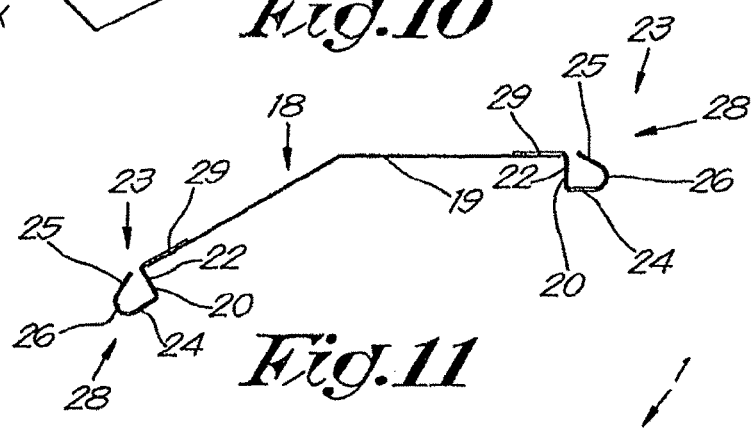
FIGS. 11 and 13 show a bridge such as that of FIG. 3, but for application in a coupling according to FIGS. 10 and 12 respectively.
Figure 13:
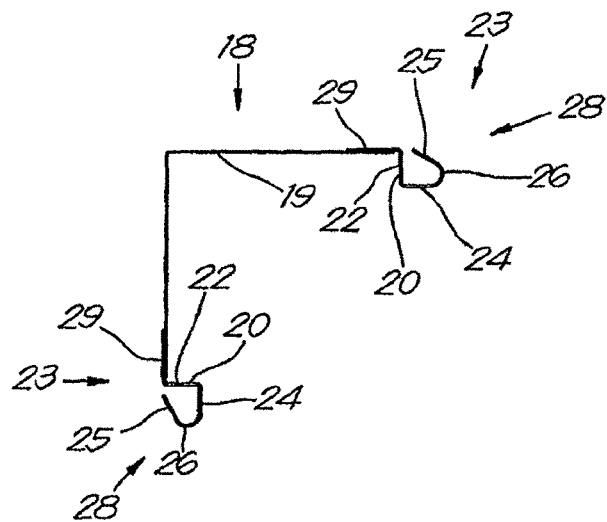

In these cases the connecting part 19 of the bridge 18 is curved through the same angle as the body 5 of the coupling 1, as shown in FIGS. 11 and 13 respectively, so that this connecting part 19 can fit precisely on the inside wall of the body 5 and thus brings about a low resistance for the flow of the gas or the liquid that flows through the coupling 1, and also does not form an obstacle after which dust or condensate can accumulate.

In the case of a T-coupling for the in-line connection of two pipes 3 and for connecting a third pipe 3 perpendicular thereto, two perpendicular bridges 18 such as those of FIG. 13 can be used for bridging the two perpendicular branches of the T-connection and a straight bridge for bridging the linear connection.

From the point of view of the production of the bridges 18 it is useful for the bridges to be made of three pieces with a connecting part 19 in the form of a slat and two heads 28 with a lip 29 with which the heads 28 are welded or similar to the connecting part 19.

Indeed, in such a case different types of couplings 1 can start with a stock of identical heads 28 and a stock of adapted connecting parts 19 that are folded into a suitable form according to the required type of coupling.

It is clear that alternatively the bridges 18 can also be folded as a single whole from one metal slat, or assembled from an arbitrary number of parts.

The form of the bridges 18 can also differ from the most preferred embodiment of FIG. 3.

Figure 14:
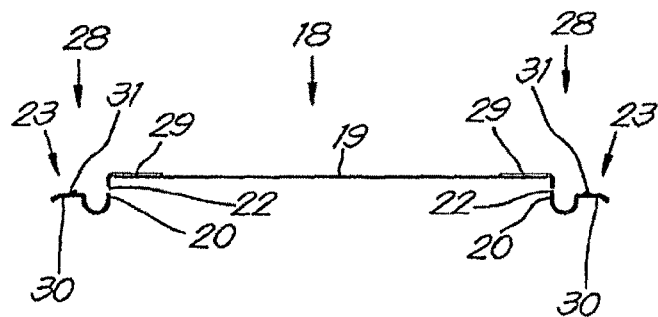
FIGS. 14 and 15 each show an alternative embodiment of a bridge according to the invention.

FIG. 14 shows an example of such a different embodiment that is also constructed as a clamping bracket with clamping sections 20 and clamping elements 23 with a contact section 30 that is elastically movable in the radial direction when pushing in a pipe end 2, and which is preferably provided with a tooth pushed outwards towards the inside that can act as a type of barb to secure a mounted pipe end.

Figure 15:
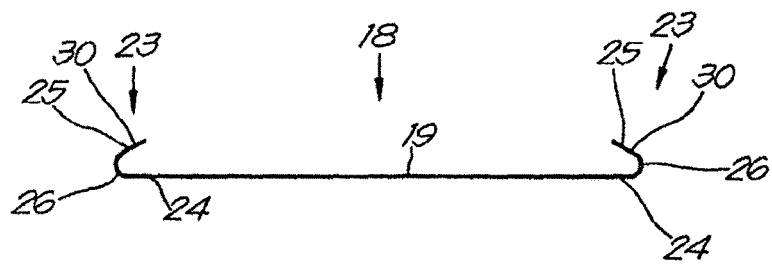

FIG. 15 shows another example of an alternative embodiment, whereby in this case the connecting part 19 and the clamping sections 20 are produced from one slat whose ends are folded back towards one another in a U-shape or V-shape, and whereby in this case the bridge 18, or at least the connecting part 19 of the bridge 18, is intended to be flush-mounted in a groove, not shown, of the body 5, whereby this groove extends from one seat 17 to another seat 17.

The present invention is by no means limited to the embodiment described as an example and shown in the drawings, but a coupling according to the invention and a bridge applied therewith can be realised in all kinds of forms and dimensions without departing from the scope of the invention.

The invention claimed is:

1. A coupling for connecting pipe ends comprising:
   a hollow body comprising at least a first end and a second end, wherein said first end and second end each includes an entrance configured to connect to a first pipe end and a second pipe end, respectively,
   wherein each entrance is provided with a radial seat configured to receive the respective pipe end having an outside radius,
   wherein a coupling nut is provided at each end of the hollow body configured to clamp one of the pipe ends in the coupling,
   wherein the hollow body is provided with a bridge along an inner surface of the hollow body, said bridge comprised partially of electrically conductive material and at least two ends that each include a clamping element at a location of the radial seat, respectively, wherein each said clamping element is elastically deformable in a radial direction with respect to the respective radial seat and is provided with a contact section, which in a rest position is at a distance from an axis of the radial seat that is smaller than the outside radius of the pipe end for which the radial seat concerned is intended.

2. The coupling according to claim 1, wherein the contact section of at least one of the clamping elements is provided with one or more teeth oriented inwards.

3. The coupling according to claim 1, wherein at least one of the entrances of the hollow body of the coupling is provided with an axial end stop for the insertion of a pipe end.

4. The coupling according to claim 3, wherein the end stop is formed by a shoulder that is formed by a stepped narrowing of a wide section of the entrance with a radius that is greater than the radius of the pipe end for which the seat of the entrance concerned is intended, and a narrow section with a radius that is smaller than the radius of the pipe end.

5. The coupling according to claim 4, wherein the seat is provided in the wide section of the entrance and is formed by a series of radial ribs oriented inwards.

6. The coupling according to claim 4, wherein in the mounted situation the clamping element rests on the inside wall of the wide section of an entrance.

7. The coupling according to claim 1, wherein the bridge is formed by a clamping bracket that can be clamped or snapped into the body of the coupling.

8. The coupling according to claim 7, wherein the bridge is provided at at least two ends with a clamping section intended for clamping the bridge in the body of the coupling by snapping these clamping sections in place behind an aforementioned end stop of an entrance.

9. The coupling according to claim 1, wherein the bridge is folded from one single slat.

10. The coupling according to claim 1, wherein locking means are provided to prevent the clamping elements turning around the axis of the respective entrances of the coupling.

11. The coupling according to claim 10, wherein the aforementioned means are formed by ribs or protrusions that are provided in a wide section of an entrance, and between which a clamping element concerned can be held with a close fit.

12. The coupling according to claim 1, wherein in the axial direction the slat-shaped connecting part of the bridge has the form of the inside wall of the body of the coupling and consequently has a straight, curved or elbow shape depending on whether the bridge is intended for a straight coupling, a curved or elbow coupling or a T-coupling.

13. A coupling for connecting pipe ends comprising:
a hollow body comprising at least a first end and a second end, wherein said first end and second end each includes an entrance configured to connect to a first pipe end and a second pipe end, respectively,
wherein each entrance is provided with a radial seat configured to receive the respective pipe end having an outside radius,
wherein a coupling nut is provided at each end of the hollow body configured to clamp one of the pipe ends in the coupling,
wherein the hollow body is provided with a bridge along an inner surface of the hollow body, said bridge comprised partially of electrically conductive material and at least two ends that each include a clamping element at a location of the radial seat, respectively, wherein each said clamping element is elastically deformable in a radial direction with respect to the respective radial seat and is provided with a contact section, which in a rest position is at a distance from an axis of the radial seat that is smaller than the outside radius of the pipe end for which the radial seat concerned is intended,
wherein the bridge is formed by a clamping bracket that is able to be clamped or snapped into the body of the coupling,
wherein the bridge is provided at at least two ends with a clamping section configured to clamp the bridge in the body of the coupling by snapping each of said clamping sections in place behind an end stop at the entrance,
wherein the bridge in the form of a clamping bracket comprises a slat-shaped connecting part between two aforementioned clamping sections that are formed by a perpendicular folded section at the ends of this slat-shaped connecting part.

14. The coupling according to claim 13, wherein a protrusion or a notch is provided on at least one end stop, and a notch or protrusion respectively engaging therewith is provided in at least one perpendicular folded clamping section of a bridge to be able to snap the bridge in place.

15. A coupling for connecting pipe ends comprising:
a hollow body comprising at least a first end and a second end, wherein said first end and second end each includes an entrance configured to connect to a first pipe end and a second pipe end, respectively,
wherein each entrance is provided with a radial seat configured to receive the respective pipe end having an outside radius,
wherein a coupling nut is provided at each end of the hollow body configured to clamp one of the pipe ends in the coupling,
wherein the hollow body is provided with a bridge along an inner surface of the hollow body, said bridge comprised partially of electrically conductive material and at least two ends that each include a clamping element at a location of the radial seat, respectively, wherein each said clamping element is elastically deformable in a radial direction with respect to the respective radial seat and is provided with a contact section, which in a rest position is at a distance from an axis of the radial seat that is smaller than the outside radius of the pipe end for which the radial seat concerned is intended,
wherein at least one clamping element of the bridge is formed by a U-shaped or V-shaped folded element whose arms are elastically compressible towards one another, and which is connected by one arm to a clamping section concerned in a position whereby the opening between the arms is oriented away from the opening of the entrance concerned.

16. The coupling according to claim 13, wherein the bridge is essentially composed of three parts, which are a connecting part that is formed by a slat and two separate heads that are each folded from one metal slat to form a clamping element and a clamping section connected therewith that is folded perpendicularly to form a lip with which such a head is fastened to an end of the connecting part.

* * * * *